United States Patent [19]

Kazumi

[11] Patent Number: 4,588,274
[45] Date of Patent: May 13, 1986

[54] DATA RECORDING CONTROL DEVICE

[75] Inventor: Jiro Kazumi, Kanagawa, Japan

[73] Assignee: Canon Kabushiki Kaisha, Tokyo, Japan

[21] Appl. No.: 561,549

[22] Filed: Dec. 14, 1983

[30] Foreign Application Priority Data

Dec. 21, 1982 [JP] Japan ................................. 57-224383

[51] Int. Cl.⁴ ............................................. G03B 17/24
[52] U.S. Cl. ................................... 354/105; 354/173.1
[58] Field of Search ............ 354/105, 106, 109, 173.1, 354/173.11

[56] References Cited

U.S. PATENT DOCUMENTS 4,086,603 4/1978 Kozuki et al. ....................... 354/266
4,327,979 5/1982 Tominaga et al. ................... 354/109
4,470,677 9/1984 Tsujimoto et al. ................ 354/173.1

Primary Examiner—L. T. Hix
Assistant Examiner—David M. Gray
Attorney, Agent, or Firm—Toren, McGeady, Stanger, Goldberg & Kiel

[57] ABSTRACT

A data recording control device for a camera in which a signal representing initiation of data exposure and another signal representing termination of the data exposure are given to one and the same channel so that an automatic film winding device does not start to operate at a time during the operation of the data recorder.

7 Claims, 2 Drawing Figures

DATA RECORDING CONTROL DEVICE

BACKGROUND OF THE INVENTION

1. Field of the Invention

This invention relates to a data recording control device for a camera, and more particularly to a device for coordinating the data recorder with the camera in or to which the automatic film winder is incorporated or releasably attached.

2. Description of the Prior Art

Recording data on the same film frame as a scene being photographed generally has involved projecting a light beam bearing a pattern of the data onto the film for a specific time while the film is exposed to an image of the scene. The data recorder must be coordinated with the shutter of the camera. When an automatic film feeder for advancing the film strip for a succeeding set of exposures, for example a motor drive or winder, is combined with the data recorder, or when the manual winding lever is cocked very fast, the film advance may start before either or both the shutter and the data recorder end their operations. Thus, the object image and/or the data pattern are sometimes more or less obscured.

The problem of feeding the film before the shutter is closed has been solved by deferring generation of an actuating signal for the motor drive or winder pending termination of the release operation of the camera. Attempts have been made to solve the problem of streaking of the recorded data by providing an actuating signal for initiating the data recorder from a camera system control portion through a channel to the data recorder, and by passing a signal from the data recorder through another channel back to the camera system control portion when the operation of the data recorder ends. The camera system control portion produces an actuating system for the motor drive or winder only after detecting the signal from the data recorder and the shutter's deactuating signal or signal representing the termination of the shutter's exposure operation. The film is then advanced one frame. A system performing this method is disclosed, for example, in U.S. Pat. No. 4,086,603. However, using such a system requires providing two additional channels for transmission of signals representing the initiation and termination of the data recording operation between the data recorder and the camera control portion in the form of two pins. The total number of pairs of pins including ground to the battery is three.

The above solutions fail, at least in part, to meet the prerequisite of minimizing the bulk and size of handy cameras to permit a user to manage them easily. Also, spacing of the channels cannot easily be achieved in many cases. Because the separation between adjacent pins were unduly narrow in some prior art cameras, the electrical insulation between channels were liable to be insufficient when wet, such as with dew. When dust or foreign particles lay between pins in a pair, they interferred with proper conduction.

Also, with the aforementioned contact pins positioned on the back cover of the camera, as is common practice in the art, numerous recycles of opening and closing the back cover had the tendency to wear out the contact pins. This contributed to an increase in the possibility of creating a void in the channel and hence, the likelihood of faulty operation.

Further, efforts have been made to reduce the number of contact pins in order to avoid dificulties due to failure of the electrical insulation or faulty operation arising from difficulty in transmitting signals therethrough.

SUMMARY OF THE INVENTION

With the foregoing in mind, it is an object of the present invention to make one signal channel suffice and thereby prevent faulty operation of the camera control device.

With such an object, the present invention aims to transmit a signal for initiation of a data recording operation and another signal for termination of the data recording operation in one signal pin.

DETAILED DESCRIPTION OF THE PREFERRED EMBODIMENTS

Figure 1:
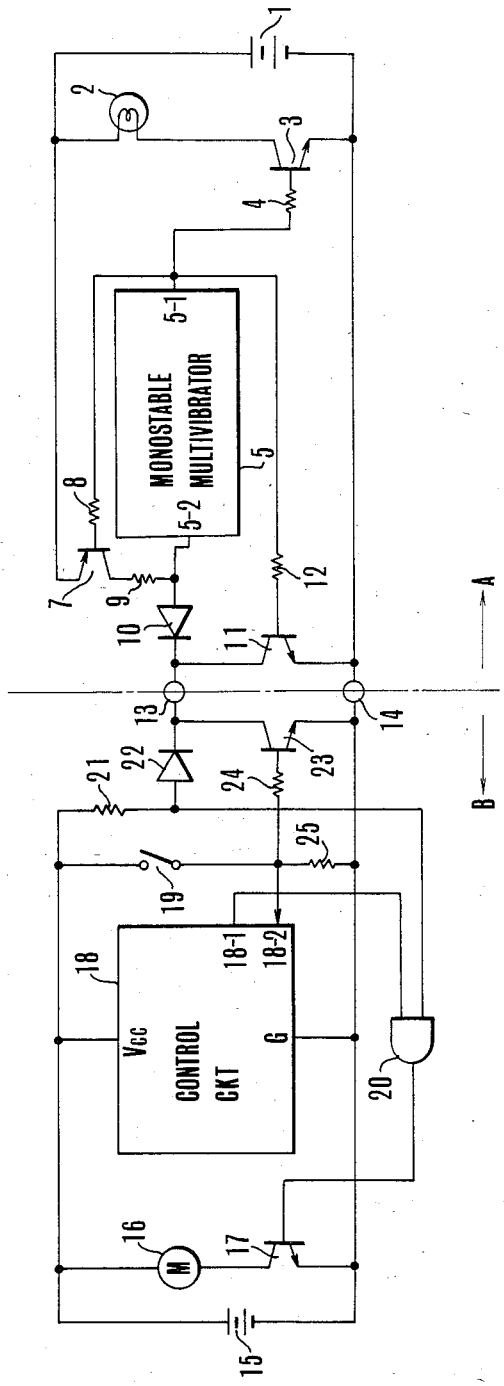
FIG. 1 is an electrical circuit of a first embodiment of a data recording control device according to the present invention.

In FIG. 1, A is a data back device; B is a camera control portion. The device A includes an electrical power source or battery 1 and a lamp 2 for exposing the data through an electric bulb in this instance, an LED or the like may be used.

A transistor 3 controls current flowing to electric bulb 2 and has a resistor 4 connected to the base of transistor 3. A monostable multivibrator 5 responsive to H level input at a terminal 5-2 produces an output of L level, and responsive to change of the input to L level changes its output to H level and maintains this level for a predetermined constant time necessary for making an exposure of data. A second transistor 7 which is turned on and off by the output of multivibrator 5 has a resistor 8 connected to a base of transistor 7 and a resistor 9 connected to the collector of transistor 7. A diode 10 prevents reverse current from camera control B to data back A. A third transistor 11 controls current flowing from camera control B to data recorder A and has a resistor 12 connected to the base of transistor 11. 13 is a pair of pins when in contact with each other to form an electrical channel for signals between camera control B and recorder A. Another pair of pins 14 when in contact connect circuit earth bases of camera control B and data recorder A.

Camera control B includes an electrical power source or battery 15 and an electrical motor 16 forming part of a film feeder such as a motor drive or winder. A transistor 17 controls current for driving motor 16. A control circuit of camera control portion B has details as shown in U.S. Pat. No. 4,086,603, FIG. 2. An L level signal appears at its output terminal 18-1 after the film has been wound up and when the film is being exposed. After the exposure is completed, it changes to H or high level. This terminal 18-1 corresponds to the terminal t5 of FIG. 2 of U.S. Pat. No. 4,086,603. An input terminal 18-2 detects whether or not the film exposure is in progress, and corresponds to the terminal of signal 127 in FIG. 2 of U.S. Pat. No. 4,086,603. A normally open switch 19 is turned on when a shutter button is depressed to a second position in its stroke and is held ON only when the film is exposed. An AND gate 20 has two inputs one of which is connected to terminal 18-1 and the other of which is connected through a diode 22 to the contact pin 13. A resistor 21 prevents short-circuit current when transistor 11 turns on. A diode 22 prevents reverse current from data recorder A to camera B. A transistor 23 controls current flowing from data recorder A to camera B, and has a resistor 24 connected to the base of transistor 23.

The operation of the circuit of FIG. 1 is as follows: In an initial position where the shutter button is not yet depressed to the second position of its stroke, switch 19 is OFF, the output of control circuit 18 at terminal 18-1 is low, and the output of monostable multivibrator 5 is low at which makes transistor 7 conduct. Therefore, the output of the camera control B at contact pin 13 is high. Then when the shutter button is further depressed to the second position of its stroke, the switch 19 is turned on, to initiate an exposure of the film. Such closure of switch 19 also causes conduction of transistor 23. Then a current flows from battery 15 of camera B through resistor 21, diode 22 and transistor 23 to the circuit earth. Responsive to this, data recorder B allows a current to flow from battery 1 through transistor 7, resistor 9, diode 10 and contact pin 13 to resistor 23. Thus, the signal at pin 13 is changed to low and is applied to input terminal 5-2 of monostable multivibrator 5. Therefore, the output of multivibrator 5 changes to H and is maintained at this level for the constant time necessary for making a proper exposure of data, while the base potential of transistor 7 becomes high, and transistor 7 is turned off. The current no longer flows to resistor 9.

Responsive to the H level of the output of monostable multivibrator 5, transistor 12 turns on and transistor 3 turns on, thereby lighting lamp 2. During the constant time when the output of multivibrator 5 at terminal 5-1 is high, the film is exposed to light bearing data as the data are illuminated by the energized lamp 2. At the termination of duration of this time, monostable multivibrator 5 changes its output from level H to L which turns transistor on, and transistors 3 and 11 off. As the data exposure is completed before the shutter is closed, therefore, current flows from battery 1 through transistor 7, resistor 9, diode 10 and contact pin 13 to transistor 23 and therefrom to the contact pin 14, and also from battery 15 through resistor 21 and diode 22 to transistor 23. Since the output of control circuit 18 at terminal 18-1 is low, AND gate 20 produces an output of L level to maintain transistor 17 non-conducting. Therefore, film winding motor 16 is not supplied with current, and does not rotate. After that, when the shutter is closed, switch 19 is opened, causing the output of control circuit 18 to change to H, and also causing transistor 13 to turn off. Therefore, the potential at contact pin 13 becomes high. As the inputs of AND gate 20 both go high, its output changes from L to H. Responsive to this, transistor 17 is turned on to energize motor 16. Then when the film is wound one frame, control circuit 18 changes its output to L level at which motor 16 is stopped. Alternatively, assuming that the shutter speed is faster than the data exposure time, then when the shutter is closed, switch 19 is opened to change one of the two inputs of AND gate 20 to H level. But the other input remains low because the current from battery 15 continues to flow through resistor 21, diode 22 and contact pin 13 to transistor 11 and therefrom to the contact pin 14. Therefore, the output of AND gate 20 remains low and transistor 17 does not conduct and motor 16 is unenergized the output of monostable multivibrator 5 changes from H to L level, transistors 3 and 11 are turned off, and transistor 7 is turned on. This turns lamp 2 off. Thus, the data exposure is completed. Such non-conduction of transistor 11 also causes change of the output of AND gate 20 to H level. Responsive to this, transistor 17 is turned on to energize motor 16. When the film is wound one frame, control circuit 18 changes its output at terminal 18-1 to low. Therefore, the output of AND gate 20 changes to L level, at which motor 16 stops.

It should be pointed out that although, in the foregoing embodiment, the means for producing a signal for initiation of a data exposure is constructed in the form of a control circuit 18, another form of switching means that cooperates with the release switch may be employed. The signal forming means responsive to detection of a change of the potential of the signal channel for producing a control signal for data exposure is in the form the monostable multivibrator 5. Instead of this, timer and switching means may be used. The data exposure termination detecting means for changing the potential of the signal channel when the lamp is lighted off is constructed in the form of a transistor 11. But another form of switching element may be employed, provided that the potential of the signal channel is caused to change. Though switch 19 is arranged to operate with a deactuating signal for the shutter, it may be otherwise arranged to operate with the shutter, for example, the trailing curtain of the focal plane shutter. The means for producing an actuating signal for the automatic film feeder use is in the form of the AND gate 20. Instead of this, another coincidence means may be employed, provided that the actuating signal is produced when the data exposure termination detector and the picture exposure termination detector gives off outputs simultaneously.

Although no means for selectively presenting data to be recorded with illumination by the lamp 2 are shown, where different data for different film frames are recorded, a control circuit for successive presentations of different data can be of course constructed in such a way as to reasonably combine with the circuit of the invention.

According to the present invention, automatic winding of the film is carried out after both of the image exposure operation and the data recording operation have been completed. Therefore, the number of signal channels can be reduced without having to blur the image and/or the date. Even without the use of the data recorder, the camera with the signal channel 13 and the earth channel 14 opened can still operate normally. Therefore, it is easy to provide a data recorder of the removably attached type. And further, when transistor 7 in the stationary state is ON, transistors 11 and 23 are OFF. Here when switch 19 is turned off, a current flows through a loop from battery 1 of data recorder A to transistor 7, resistor 9, diode 10, transistor 23 and then to battery 1, causing the output of monostable multivibrator 5 to change from H to L level, at which transistor 7 is turned off. As a result, the above-described loop is supplied with current in the form of impulse. Therefore it is possible to prevent a large current flowing to the resistor 9 and to reduce the consumption of electrical energy. Moreover, the resistor 9 is not necessarily high in value. The use of a low resistance value in the resistor 9 offers another advantage, namely that even when dew between the contact pin 13 or 14 freezes and insert an apparent high resistor therebetween, a sufficient potential for the high level of input of multivibrator 5 can be secured at the contact pin 13. This reduces the possibility of a faulty operation which would otherwise result from a drop of that potential.

Figure 2:
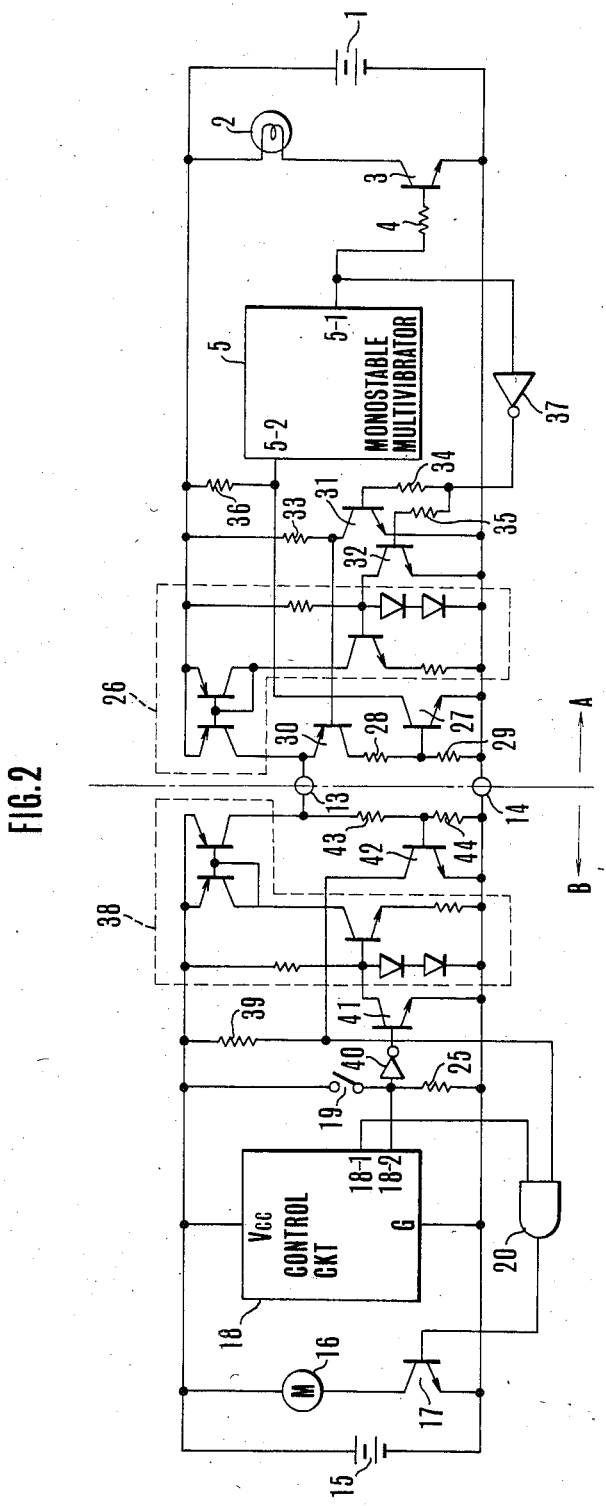
FIG. 2 is an electrical circuit of a second embodiment of the data recording control device according to the present invention.

Next, a second embodiment of the invention will be described by reference to FIG. 2. While the first embodiment makes use of the change of the voltage of the terminal 13 in differentiating the two signals for the initiation and termination of the data exposure from each other, the second embodiment differentiates those signals by changing the current flowing to the terminal 13. In FIG. 2 the same reference characters have been employed to denote the parts similar to those shown in FIG. 1, and their explanation is omitted. In FIG. 2, a constant current circuit 26 is constructed so that when a transistor 32 is turned off, a constant current is produced. Resistors 28 and 29 have resistance values determined so that a transistor 27 is turned on by a current flowing from the constant current circuit 26 through a collector-emitter path of a transistor 30. The output of monostable multivibrator 5 at terminal 5-1 is connected to both of the resistor 4 and an inverter 37. The output of inverter 37 is connected through a resistor 34 to the base of a transistor 31 and through a resistor 35 to the base of a transistor 32. The collector of transistor 31 is connected to the base of transistor 30 and through a resistor 33 to the battery 1. The collector of transistor 32 is connected to the anode of a diode in constant current circuit 26 so that, as has been described above, when transistor 32 is turned on, the operation of constant current circuit 26 stops.

A constant current circuit 38 is constructed so that when a transistor 41 is turned off, a constant current is produced. Resistors 43 and 44 have resistance values determined so that when the constant current from either of the constant current circuits 28 and 26 flows therethrough, a transistor 42 is turned on. A resistor 39 is connected between battery 15 and the collector of transistor 42. An inverter 40 is connected to the switch 19 so that when switch 19 is ON, a signal of L level is produced, and when OFF, another signal of H level is produced.

The operation of the circuit of FIG. 2 is as follows: When a shutter release button (not shown) is depressed to initiate an exposure operation of the camera and turn on switch 19, the output of inverter 40 is changed to L level, and transistor 41 is turned off to allow current to flow from constant current circuit 38.

Since, at this time, the signal at output terminal 5-1 of monostable multivibrator 5 is low, inverter 37 produces a high signal which is applied to the bases of transistors 31 and 32, and they both conduct. Hence, transistor 30 conducts. Therefore constant current circuit 26 is not rendered operative. Then the output current from constant current circuit 38 flows through terminal 13, the emitter-corrector path of transistor 30 and resistors 28 and 29. As the potential at the base of transistor 27 rises, transistor 27 is turned on, changing the input of monostable multivibrator 5 at terminal 5-2 to L level. Responsive to this, monostable multivibrator 5 changes its output to H level at terminal 5-1. This output is maintained at H level for a predetermined constant time. Therefore, transistor 3 conducts fo that constant time. Hence, lamp 2 is lighted on for that constant time to initiate an exposure of data. Such change of the output of multivibrator 5 also causes change of the output of inverter 37 to L level at which transistor 32 is turned off and constant current circuit 26 starts to operate.

Now assuming that the shutter speed is faster than the data exposure time, then when the exposure operation of the camera is completed, switch 19 moves from ON to OFF where inverter 40 produces an output of H level. Responsive to this, transistor 41 is turned on, thereby stopping the operation of constant current circuit 38. Nevertheless, until the termination of duration of the constant time necessary for making a proper exposure of the data, the signal produced from terminal 5-1 of monostable multivibrator 5 sustains continuation of the operation of constant current circuit 26. It is therefore through terminal 13 that the constant current from circuit 26 flows to resistors 43 and 44. As the potential at the base of transistor 42 then rises, transistor 42 is turned on, changing one of the two inputs of AND gate 20 to L level. Therefore, the output of AND gate 20 goes low, rendering transistor 17 non-conducting. Thus motor 16 is unenergized, and the film is not advanced. When the signal at the output terminal 5-1 of multivibrator 5 changes from H to L level to terminate the data exposure, constant current circuit 26 is rendered inoperative, and transistor 42 is turned off, changing the output of AND gate 20 to H level. Responsive to this, transistor 17 is turned on to supply current to motor 16, and the film is advanced a length of one frame. Upon detection that the film has advanced one frame, the output signal at the terminal 18-1 of control circuit 18 changes to L level, which in turn changes the output of AND gate 20 to L level. Then transistor 17 is turned off to stop motor 16 from further rotation.

As has been described in greater detail above, according to the present invention, a coordination control that allows automatic winding of the film to take place after the data has been recorded is realized while still permitting reduction of the number of contact pins on the data recorder from three as in the prior art to two. This offers the advantages that the distance between the contact pins of the small-sized instrument such as camera can be widened, and that the electrical insulation between the adjacent contact pins, and the electrical conduction across the contact pins in each pair can be prevented from becoming insufficient by deposition of dew, and the possibility of occurrence of a faulty operation can be reduced. A further advantage is that the production cost is also reduced.

What I claim:

1. A date recording control device for a camera system including a data recorder capable of recording data on a film surface and a camera, comprising:
   (a) data recording initiation signal forming means for initiating an exposure of data;
   (b) a single line connected between the camera and the data recorder for transmission of a signal from said data recording initiation signal forming means; and
   (c) data recording termination signal forming means for producing a data recording termination signal transmitted by said single line from said recorder to said camera.

2. A data recording control device according to claim 1, further comprising:
   (a) data recording termination detecting means for detecting said data recording termination signal;
   (b) film exposure termination signal detecting means for detecting whether the film exposure is terminated; and
   (c) film advance signal forming means for producng a film advance signal when the data exposure termination is detected by said data recording termination detecting signal, and when the film exposure termination is detected by said film exposure termination signal detecting means.

3. A camera system including:
(A) a data recorder;
(B) a camera comprising:
  (a) recording initiation signal forming means for initiating a data exposure operation to a film exposure;
  (b) data recording termination detecting means for detecting a recording termination signal in response to a signal from said data recorder;
  (c) image exposure termination detecting means for detecting whether exposure of the film to an image is terminated; and
  (d) film advance signal forming means for producing a film advance signal when the termination of the data exposure is detected by said data recording termination detecting means and when the termination of the image exposure is detected by said film exposure termination detecting means; and
(C) a signal transmission line for connecting said recorder and said camera with each other and for transmitting said recording initiating signal and said recording terminal signal.

4. A data recording control device for a camera system comprising a data recorder capable of recording data on a film surface and a camera, comprising:
  (a) a single signal line connecting said data back device with said camera;
  (b) data recording initiation signal forming means for changing the potential of said signal line when a film is exposed to an image;
  (c) recording signal forming means responsive to detection of the change of the potential of said signal line for producing a recording signal that causes a recording operation of said data recorder;
  (d) data recording termination signal forming means for changing the potential of said signal line when the recording operation of said data back device is terminated in sequence with the change of the potential of said signal line by said data recording initiation signal forming means;
  (e) data recording termination detecting means for detecting the change of the potential of said signal line by said data recording termination signal forming means.

5. A data recording control device for a camera system includes a camera and a data recorder capable of recording data on a film surface, comprising:
  (a) a single signal line connecting said data back device with said camera;
  (b) data recording initiation signal forming means for changing the current of said signal line when a film is exposed to an image;
  (c) recording signal forming means responsive to detection of the current change of said signal line for producing a recording signal that causes said data recorder to perform a recording operation;
  (d) data recording termination signal forming means for changing the current of said signal line when the recording operation of said data back device is terminated in sequence with that change of the current of said signal line which is due to said data recording initiation signal forming means;
  (e) data recording termination detecting means for detecting that change of the potential of said signal line which is due to said data recording termination signal forming means.

6. A data recording control device as in claim 4, further comprising:
  (a) image exposure termination signal detecting means for detecting whether a film exposure to an image is completed; and
  (b) film advance signal forming means responsive to and of the outputs of said data recording termination detecting means and said image exposure termination signal detecting means for producing a film advance signal.

7. A data recording control device of claim 5, further comprising:
  (a) exposure termination detecting means for detecting whether a film exposure to an image is completed; and
  (b) film advance signal forming means responsive to the outputs of said data recording termination detecting means and said exposure termination detecting means for producing a film advance signal.

* * * * *